US012471228B2

United States Patent
Lo et al.

(10) Patent No.: US 12,471,228 B2
(45) Date of Patent: Nov. 11, 2025

(54) HOST CASING HAVING QUICK RELEASE ROTATING SHAFT STRUCTURE

(71) Applicant: AETINA CORPORATION, New Taipei (TW)

(72) Inventors: Chih-Jung Lo, New Taipei (TW); Ying-Jui Hung, New Taipei (TW); Yung-Ho Lee, New Taipei (TW)

(73) Assignee: AETINA CORPORATION, New Taipei (TW)

( * ) Notice: Subject to any disclaimer, the term of this patent is extended or adjusted under 35 U.S.C. 154(b) by 132 days.

(21) Appl. No.: 18/522,283

(22) Filed: Nov. 29, 2023

(65) Prior Publication Data

US 2024/0306330 A1    Sep. 12, 2024

Related U.S. Application Data

(60) Provisional application No. 63/451,240, filed on Mar. 10, 2023.

(51) Int. Cl.
| | |
|---|---|
| *H05K 5/02* | (2006.01) |
| *G06F 1/18* | (2006.01) |
| *H01R 13/518* | (2006.01) |
| *H01R 25/00* | (2006.01) |
| *H05K 5/03* | (2006.01) |
| *H05K 5/10* | (2025.01) |

(52) U.S. Cl.
CPC ........... *H05K 5/0217* (2013.01); *G06F 1/181* (2013.01); *H01R 13/518* (2013.01); *H01R 25/006* (2013.01); *H05K 5/0221* (2013.01); *H05K 5/0226* (2013.01); *H05K 5/03* (2013.01); *H05K 5/10* (2025.01)

(58) Field of Classification Search
CPC .... G06F 1/181; H05K 5/0217; H05K 5/0221; H05K 5/0226; H05K 5/03; H05K 5/10; H01R 13/518; H01R 25/006
USPC ........................................................ 312/223.2
See application file for complete search history.

(56) References Cited

U.S. PATENT DOCUMENTS

| | | | | |
|---|---|---|---|---|
| 6,859,359 | B2 * | 2/2005 | Young ................. | H05K 7/1462 361/679.48 |
| 10,033,121 | B2 * | 7/2018 | Aguirre ............... | H05K 5/0221 |
| 2005/0092727 | A1 * | 5/2005 | Fraley ................. | G11B 33/128 |
| 2005/0104863 | A1 * | 5/2005 | Kroll ..................... | G06F 1/20 345/173 |
| 2011/0084106 | A1 * | 4/2011 | Bopp ..................... | B64D 45/00 224/563 |
| 2013/0229764 | A1 * | 9/2013 | Coster .................. | H05K 5/0221 312/223.2 |

(Continued)

*Primary Examiner* — James O Hansen

(57) ABSTRACT

A host casing having a quick release rotating shaft structure includes a casing body, an upper cover, and a rotating shaft. The casing body has an opening, which has a first shaft opening on one side thereof, and the upper cover has a second shaft opening on a position corresponding to the one side. The rotating shaft has a head, and an insert portion connected to the head and inserted into the first and second shaft openings so as to connect the casing body and the upper cover. A periphery of a cross section of the head is non-equidistant to an axial center, and has a largest distance and a smallest distance. The upper cover has a limiting portion on a position corresponding to the head. A distance from the limiting portion to the axial center of the rotating shaft is between the largest and smallest distances.

4 Claims, 3 Drawing Sheets

(56) References Cited

U.S. PATENT DOCUMENTS

2017/0235346 A1\* 8/2017 Burghart ................ G06F 1/181
                                                    312/223.2

\* cited by examiner

HOST CASING HAVING QUICK RELEASE ROTATING SHAFT STRUCTURE

CROSS-REFERENCE TO RELATED APPLICATION

This non-provisional application claims priority under 35 U.S.C. § 119 (e) on U.S. provisional Patent Application No. 63/451,240 filed on Mar. 10, 2023, the entire contents of which are hereby incorporated by reference.

BACKGROUND OF THE INVENTION

1. Field of the Invention

The present disclosure relates to a host casing, and in particular to a host casing having a quick release rotating shaft structure.

2. Description of the Related Art

In general, for maintenance or replacement due to malfunction inside a host, a casing of a computer host first needs to be opened up, and a device with the malfunction is then removed by hand tools after locating such device. Once the maintenance is complete, the casing is again opened up to re-install the device using a hand tool. However, the above processes of removal and installation need to rely on hand tools, and may not be sufficiently convenient and are time consuming in terms of maintenance.

BRIEF SUMMARY OF THE INVENTION

Therefore, to overcome various issues of a conventional host casing, the present disclosure provides a host casing having a quick release rotating shaft structure.

To achieve the above and other objects, the present disclosure provides a host casing having a quick release rotating shaft structure, including: a casing body, having an opening, one side of the opening is provided with a first shaft opening; an upper cover, provided with a second shaft opening on a position corresponding to the one side; and a rotating shaft, having a head and an insert portion connected to the head, the insert portion inserted into the first shaft opening and the second shaft opening so as to connect the casing body and the upper cover. A periphery of a cross section of the head is non-equidistant to an axial center, and has a largest distance and a smallest distance. The upper cover is provided with a limiting portion on a position corresponding to the head, and a distance from the limiting portion to the axial center of the rotating shaft is between the largest distance and the smallest distance.

In an embodiment of the present disclosure, the rotating shaft is rotatably inserted into the first shaft opening and the second shaft opening, the head and the limiting portion are in mutual interference in a direction of an axis when the rotating shaft is at a first angle relative to the upper cover, and the head and the limiting portion are not in mutual interference in the direction of the axis when the rotating shaft is at a second angle relative to the upper cover.

In an embodiment of the present disclosure, the limiting portion is in a hollow form.

In an embodiment of the present disclosure, the first shaft opening, the second shaft opening, and the rotating shaft are plural in quantity and are disposed on the one side.

In an embodiment of the present disclosure, the host casing having a quick release rotating shaft structure further includes a fixing frame disposed on a surface of the upper cover facing the casing body.

Thus, the host casing having a quick release rotating shaft structure of the present disclosure in conjunction with a shape of the head enables the rotating shaft to be selectively limited by the limiting portion and be prevented from departing from the first shaft opening and the second shaft opening, hence maintaining a pivotal connection between the casing body and the upper cover. When the rotating shaft is not limited by the limiting portion, the upper cover is allowed to depart from the casing body, thereby achieving the object of quick release.

DETAILED DESCRIPTION OF THE INVENTION

To fully understand the present disclosure, the present disclosure is described in detail by way of specific embodiments with the accompanying drawings below. A person skilled in the art would be able to understand the objects, features and effects of the present disclosure from the disclosure of the present application. It should be noted that, the disclosure may be implemented or applied by other specific embodiments, and changes and modifications may also be made on the basis of different perspectives and applications to various details in the description without departing from the spirit of the present disclosure. Technical contents associated with the present disclosure are described in detail below, and it should be noted that the disclosure is not to be construed as limitations to the scope of protection of the present disclosure. Associated details are as given in the description below.

Figure 1:
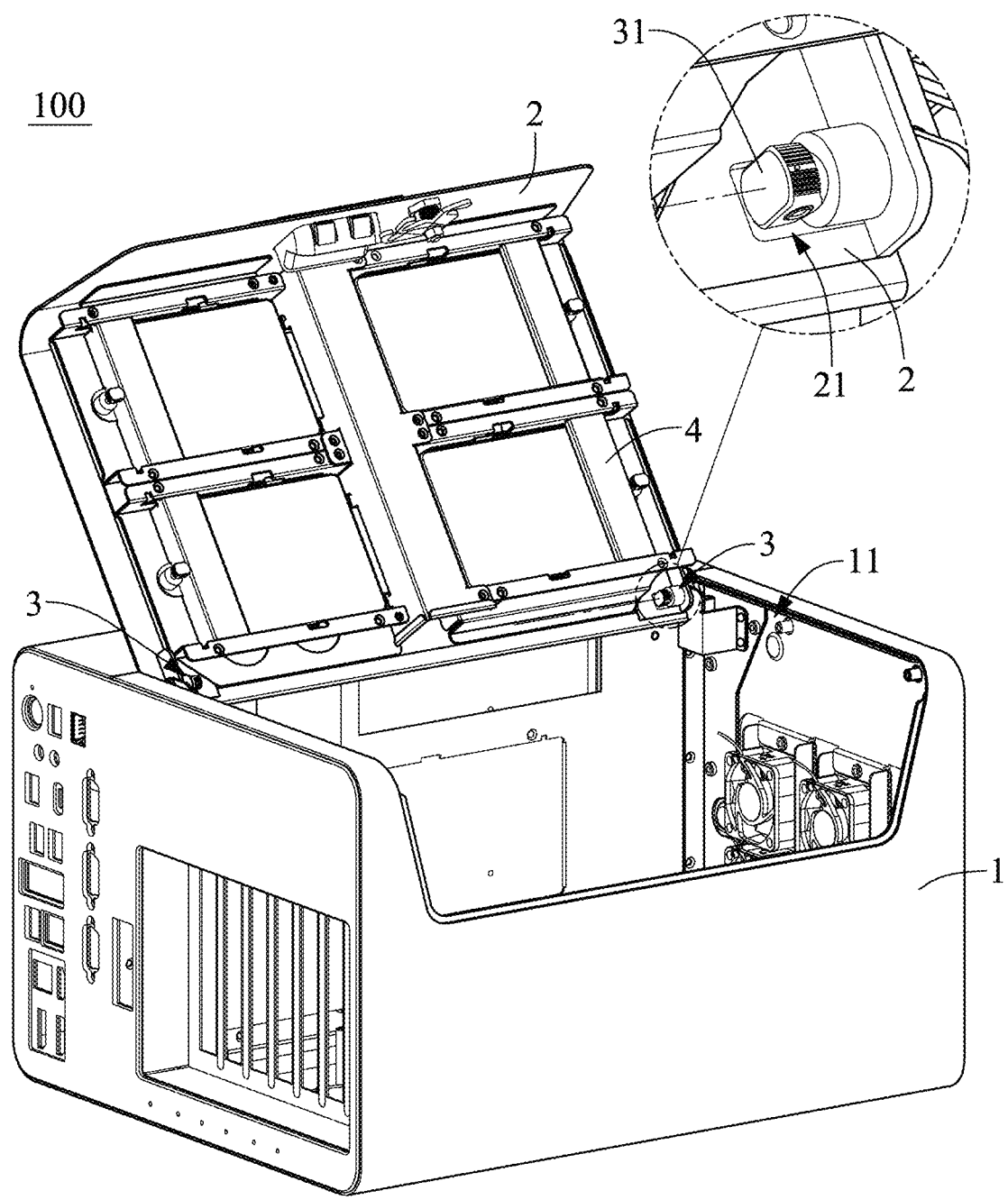
FIG. 1 is a perspective schematic diagram of a host casing having a quick release rotating shaft structure according to an embodiment of the present disclosure, wherein a rotating shaft is at a first angle relative to an upper cover.
Figure 2:
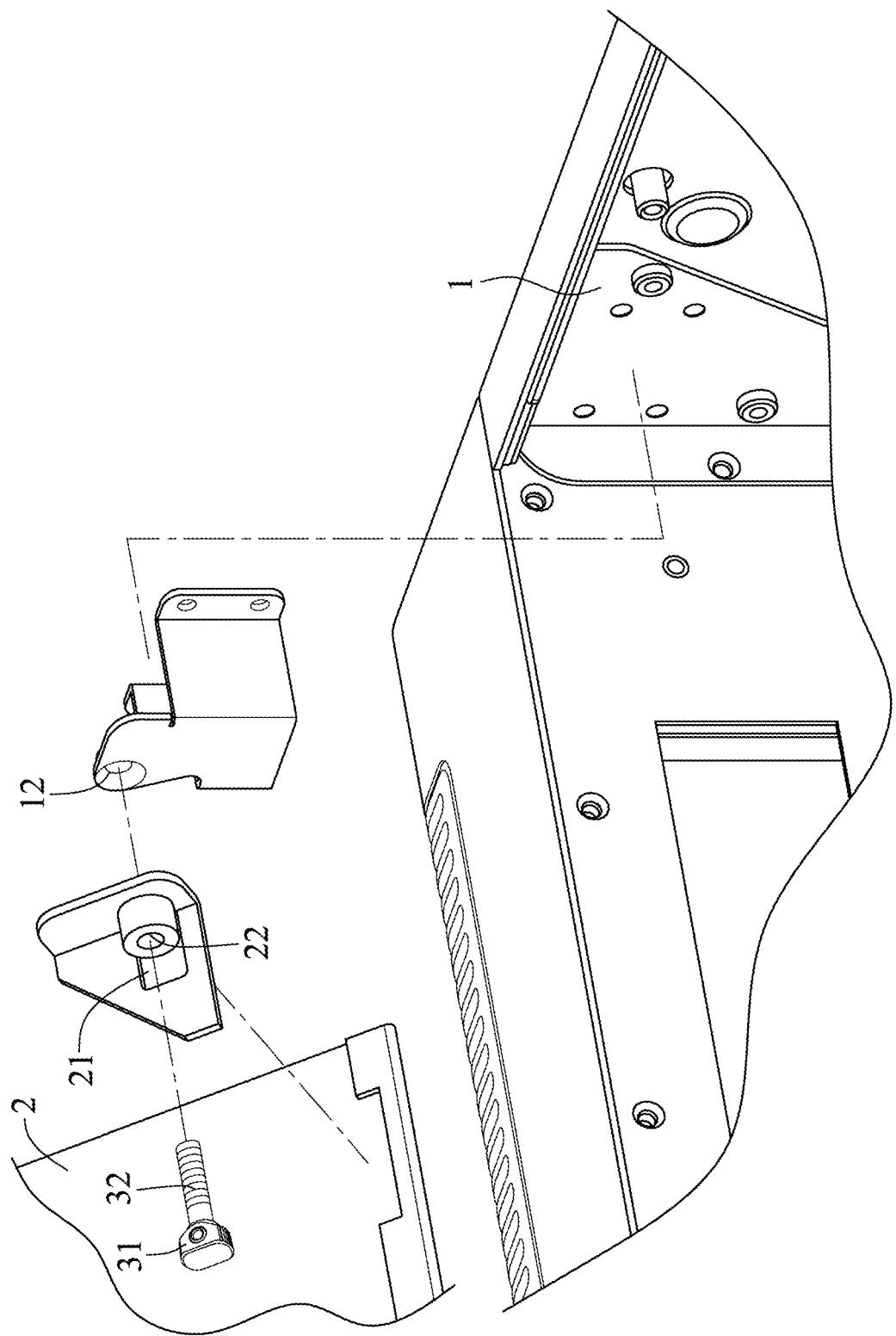
FIG. 2 is an assembly diagram of a host casing having a quick release rotating structure according to an embodiment of the present disclosure.

As shown in FIG. 1 and FIG. 2, a host casing 100 having a quick release rotating shaft structure according to an embodiment of the present disclosure includes a casing body 1, an upper cover 2, and a rotating shaft 3.

The casing body 1 includes an opening 11, and a first shaft opening 12 is provided on one side of the opening 11.

The upper cover 2 is for covering the opening 11 of the casing body 1, and a second shaft opening 22 is provided at the upper cover 2 on a position corresponding to the one side.

The rotating shaft 3 includes a head 31 and an insert portion 32 connected to the head 31. The insert portion 32 is inserted into the first shaft opening 12 and the second shaft opening 22 so as to connect to the casing body 1 and the upper cover 2.

Details of the tool-free quick release and separation of the casing body 1 and the upper cover 2 are to be described below.

Figure 3:
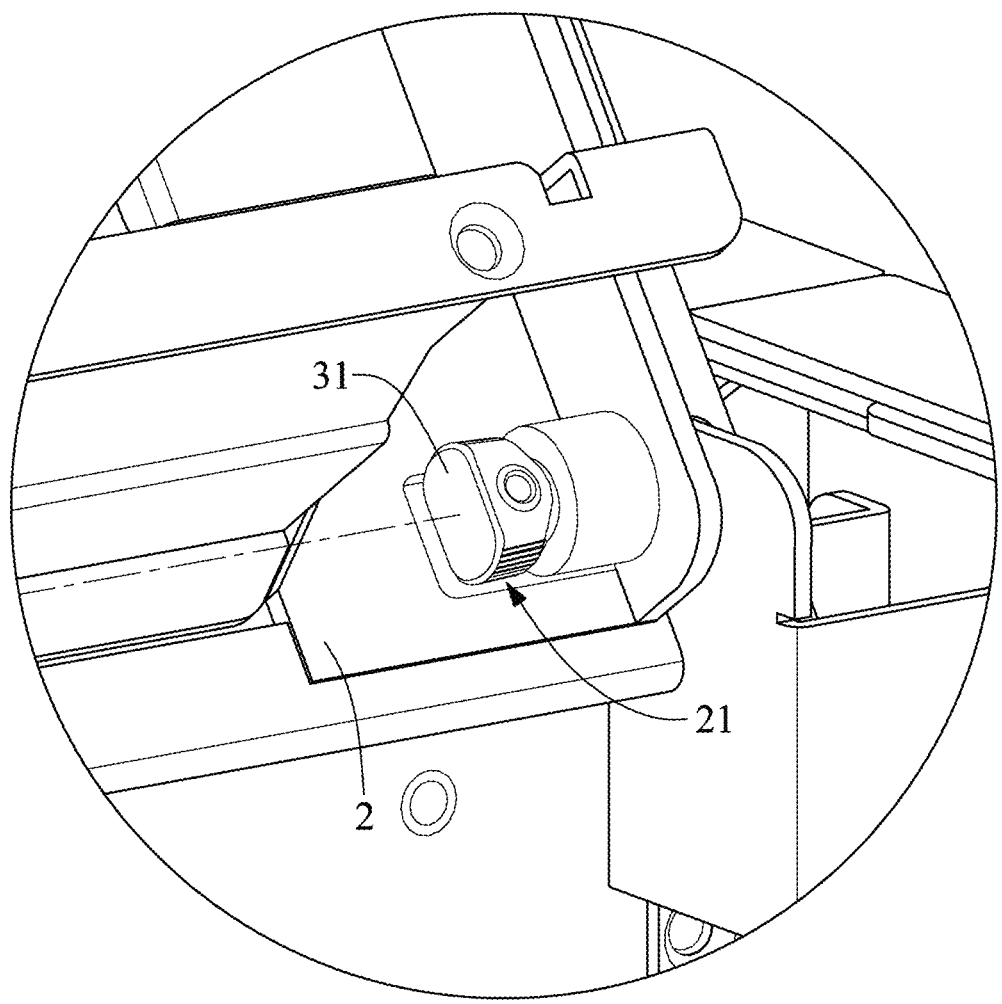
FIG. 3 is an enlarged partial schematic diagram of a host casing having a quick release rotating shaft structure according to the embodiment of the present disclosure, wherein a rotating shaft is at a second angle relative to an upper cover.

As shown in FIG. 1 and FIG. 3, on a cross section of the head 31 of the rotating shaft 3, a diameter of the head 31 is non-equidistant; that is, the cross section of the head 31 is non-circular, a periphery of the cross section of the head 31 is non-equidistant to an axial center of the rotating shaft 3, and there are at least two or more distances such that a largest distance and a smallest distance are produced. The so-called largest distance is a farthest distance from the periphery of the cross section of the head 31 to the axial center, and the smallest distance is a closest distance from the periphery of the cross section of the head 31 to the axial center. For example, in an embodiment, a shape of the cross section of the head 31 is a rectangle with rounded corners, and is a double symmetric shape. A center of a lengthwise side of the cross section of the head 31 is closest to the axial center, and is the smallest distance. Other points on the lengthwise side of the cross section of the head 31 get farther away from the axial center, and it is the farthest at the rounded corner, being the largest distance. However, the present disclosure is not limited to the examples above. The cross section of the head 31 may be in another shape, for example, an ellipsoid, a square, a triangle, or any shape having a non-circular cross section and a periphery non-equidistant to the axial center that is suitable as a cross section of the head 31.

Corresponding to the design of the head 31, the upper cover 2 is provided with a limiting portion 21 on a position corresponding to the head 31, and a distance of the limiting portion 21 to the axial center of the rotating shaft 3 is between the largest distance and the shortest distance described above. Preferably, the limiting portion 21 is in a hollow form so as to allow the head 31 to rotate in the limiting portion 21. In other embodiments of the present disclosure, the limiting portion 21 may also be in a recessed form to provide a yield.

Thus, with the limiting portion 21 in conjunction with the shape of the head 31, the rotating shaft 3 is enabled to be selectively limited by the limiting portion 21 and be prevented from departing from the first shaft opening 12 and the second shaft opening 22, hence maintaining a pivotal connection between the casing body 1 and the upper cover 2. When the rotating shaft 3 is not limited by the limiting portion 21, the upper cover 2 is allowed to depart from the casing body 1, thereby achieving the object of quick release.

Further, in an embodiment, the rotating shaft 3 is rotatably inserted into the first shaft hole 12 and the second shaft hole 22. When the rotating shaft 3 is at a first angle relative to the upper cover 2 (for example, the state in FIG. 1), the head 31 extends into the limiting portion 21. At this point, the head 31 and the limiting portion 21 are in mutual interference in a direction of an axis, so that the rotating shaft 3 is incapable of departing from the first shaft opening 12 or the second shaft opening 22 along the direction of the axis, hence maintaining the pivotal connection between the casing body 1 and the upper cover 2.

In contrast, as shown in FIG. 3, when the rotating shaft 3 is at a second angle relative to the upper cover 2, a portion of the periphery of the cross section of the head 31 having the smallest distance faces the limiting portion 21, such that the head 31 is no longer limited in the limiting portion 21, and the head 31 and the limiting portion 21 are not in mutual interference in the direction of the axis. Thus, the rotating shaft 3 is able to depart from the first shaft opening 12 and the second shaft opening 22 along the direction of the axis, further separating the upper cover 2 and the casing body 1 and thereby achieving the object of quick release. However, the present disclosure is not limited to the examples above. Since the distance from the limiting portion 21 to the axial center of the rotating shaft 3 is between the largest distance and the smallest distance, the mutual interference between the rotating shaft 3 and the upper cover 2 does not necessarily occur only at a specific angle. Alternatively, the mutual interference between the rotating shaft 3 and the upper cover 2 may be achieved or relieved at certain angles or certain angle ranges, depending on the shape of the head 31 and the coordination with the limiting portion 21.

The description above focuses on removal of the upper cover 2. Alternatively speaking, the rotating shaft 3 can sequentially pass through the second shaft opening 22 and the first shaft opening 12 so as to connect the casing body 1 and the upper cover 2 in series, and the rotating shaft 3 is rotated to produce the mutual interference between the head 31 and the limiting portion 21 in the direction of the axis to maintain the pivotal connection between the casing body 1 and the upper cover 2, thereby preventing disconnection between the casing body 1 and the upper cover 2 from happening due to influences of other external forces (for example, vibration).

The description above focuses on rotation of the rotating shaft 3, however, the present disclosure is not limited to such embodiments. In other embodiments, the upper cover 2 may be rotated to a specific angle, thereby producing or relieving the mutual interference between the rotating shaft 3 and the upper cover 2.

Further, in an embodiment, the first shaft opening 12, the second shaft opening 22 and the rotating shaft 3 are plural in quantity and are disposed on the side of the opening 11. Preferably, two sets of the first shaft opening 12, the second shaft opening 22 and the rotating shaft 3 are respectively disposed on two ends of the side of the opening 11 so as to serve as a pivotal mechanism in a balanced manner.

In addition, in an embodiment, the host casing 100 having a quick release rotating shaft structure further includes a fixing frame 4 disposed on a surface of the upper cover 2 facing the casing body 1. The fixing frame 4 may be used for fitting a data storage device so as to signally connect to other electronic devices in the casing body 1. The fixing frame 4 may be plural in quantity so as to respectively fit data storage devices. In an example, when the upper cover 2 is removed from the casing body 1 by the quick release method described above, any damaged data storage devices are also removed together, and a new upper cover 2 and a new data storage device is provided together and placed back to the casing body 1 in a reverse order of the quick release method above. However, the present disclosure is not limited to the examples above. The quick release between the upper cover 2 and the casing body 1 is not defined to be only applicable to replacement of data storage devices.

The present invention is described by way of the preferred embodiments above. A person skilled in the art should understand that these embodiments are merely for describing the present invention and are not to be construed as limitations to the scope of the present invention. It should be noted that all equivalent changes, replacements and substitutions made to the embodiments are to be encompassed within the scope of the present invention. Therefore, the scope of protection of the present invention should be accorded with the broadest interpretation of the appended claims.

What is claimed is:
1. A host casing having a quick release rotating shaft structure, comprising:
   a casing body, having an opening, one side of the opening provided with a first shaft opening;
   an upper cover, provided with a second shaft opening on a position corresponding to the one side; and a rotating shaft, having a head and an insert portion connected to the head, the insert portion inserted into the first shaft opening and the second shaft opening so as to connect the casing body and the upper cover, wherein a periphery of a cross section of the head is non-equidistant to an axial center of the rotating shaft and has a largest distance and a smallest distance;

wherein the upper cover is provided with a limiting portion on a position corresponding to the head, and a distance of the limiting portion to the axial center of the rotating shaft is between the largest distance and the shortest distance, wherein the rotating shaft is rotatably inserted into the first shaft opening and the second shaft opening, wherein when the rotating shaft is at a first angle relative to the upper cover, the head portion and the limiting portion are in mutual interference in a direction of an axis of the rotating shaft, the limiting portion limits the rotating shaft from departing from the first shaft opening and the second shaft opening along the direction of the axis of the rotating shaft, so as to maintain the pivotal connection between the casing body and the upper cover, and wherein when the rotating shaft is at a second angle relative to the upper cover, the head and the limiting portion are not in mutual interference in the direction of the axis of the rotating shaft, so that the rotating shaft is able to depart from the first shaft opening and the second shaft opening along the direction of the axis of the rotating shaft to release the pivotal connection between the casing body and the upper cover.

2. The host casing having a quick release rotating shaft structure according to claim 1, wherein the limiting portion is in a hollow form.

3. The host casing having a quick release rotating shaft structure according to claim 1, wherein the first shaft opening, the second shaft opening, and the rotating shaft are plural in quantity and are disposed on the one side.

4. The host casing having a quick release rotating shaft structure according to claim 1, further comprising a fixing frame disposed on a surface of the upper cover facing the casing body.

* * * * *